(12) United States Patent
Guzik et al.

(10) Patent No.: US 7,880,463 B2
(45) Date of Patent: Feb. 1, 2011

(54) AUTOMATED DISK CLAMPING METHOD FOR SPINSTAND FOR TESTING MAGNETIC HEADS AND DISKS

(75) Inventors: Naham Guzik, Palo Alto, CA (US); Forest Ray, Redwood City, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 660 days.

(21) Appl. No.: 11/654,214

(22) Filed: Jan. 17, 2007

(65) Prior Publication Data
US 2007/0210789 A1 Sep. 13, 2007

Related U.S. Application Data

(60) Provisional application No. 60/759,536, filed on Jan. 17, 2006.

(51) Int. Cl.
*G01R 33/12* (2006.01)
(52) U.S. Cl. ...................................... 324/212; 324/261
(58) Field of Classification Search ................. 324/210, 324/211, 212, 260, 262, 261; 360/251.1
See application file for complete search history.

(56) References Cited

U.S. PATENT DOCUMENTS

| | | | |
|---|---|---|---|
| 6,212,045 B1* | 4/2001 | Guzik | 360/255.2 |
| 7,532,006 B2* | 5/2009 | Guzik et al. | 324/210 |
| 2006/0103382 A1* | 5/2006 | Mihara et al. | 324/262 |

* cited by examiner

*Primary Examiner*—Patrick J Assouad
*Assistant Examiner*—David M. Schindler
(74) *Attorney, Agent, or Firm*—Pierce Atwood LLP; Joseph M. Maraia

(57) ABSTRACT

A mechanism for placing and removing a vacuum clamping device for a magnetic disk on a spinstand, comprised of automated vertical and horizontal movement arranged such that a vacuum disk chuck, comprised of a base (9) and cap (6), can be used without operator interaction. Linear actuators provide the horizontal (2) and vertical (3) movement forces to accurately move a chuck cap (6) over a magnetic disk (7) that has been placed on a chuck base (9). The same actuators remove the cap and move it away from the disk to allow quick replacement of the disk. The interface between the mechanism and disk chuck cap is designed such that the cap is securely held during motion, and does not create particles.

12 Claims, 7 Drawing Sheets

AUTOMATED DISK CLAMPING METHOD FOR SPINSTAND FOR TESTING MAGNETIC HEADS AND DISKS

RELATED APPLICATION

This application is related to U.S. Patent Application Ser. No. 60/759,536, filed Jan. 17, 2006, entitled Automated Disk Clamping Method for Spinstand for Testing Magnetic Heads and Disks, and incorporated by reference herein.

FIELD OF THE DISCLOSURE

The present disclosure relates to spinstands and, in particular, to automatically securing disks mounted on and spun by a spindle of a spinstand with a vacuum chuck clamping device.

BACKGROUND OF THE DISCLOSURE

A magnetic head and disk tester is an instrument that is used for testing the characteristics of magnetic heads and disks, such as a signal-to-noise ratio, track profile, etc. The tester should simulate those motions of the head with respect to the disk and the same rotational speeds of the disks that occur in an actual hard disk drive during operation. Each tester consists of two components, i.e., a mechanical component, commonly referred to as a spinstand, that performs movements of the head with respect to the disk, and an electronic component that is responsible for measurement, calculation, and analysis of the measured signal. The spinstand is also a mechanical component of a servo-writer, an instrument that is used for writing servo information on a magnetic disk, as well as a component of a flying height tester; an instrument used for measuring the flying height of a head over the disk.

Examples of prior art spinstands for a head and disk tester include the Guzik V2002 XY-positioning spinstand and the Guzik S-1701B Micro Positioning Spinstand, both of which are available from the assignee of the present disclosure, Guzik Technical Enterprises, 2443 Wyandotte Street, Mountain View, Calif. 94043, USA.

As the density of magnetic recording increases, additional information tracks are compressed into a given disk area. The decrease in track size heightens the demand for improved accuracy in head positioning. Likewise, the rotational speeds of the magnetic disks increase in order to achieve shorter access times. In addition, more disks are added to the disk stack to provide additional storage.

As the disk(s) rotate, vibrations in both the disks and the magnetic heads may be induced. These vibrations increase track misregistration. In some cases, track misregistration reaches unacceptable levels at which spinstand operation becomes unreliable.

A common prior art solution to this problem is a disk chuck consisting of a cap assembly and a base assembly. The cap and base assemblies clamp the disc to the spindle by use of a screw that passes through the cap and threads into the base. The screw attaches the cap to the base, clamping the disc with a force proportional to the fastening torque of the screw. This creates two problems. The force is dependant upon the fastening torque, which can vary from one assembly to another, and the screw must be manually inserted and removed with each disc change, adding time to the testing process.

Another prior art solution is a clamping mechanism for securing magnetic discs, shown in FIG. 8, comprised of a cap (6) and a base (9). The disc (7) is held between the cap (6) and the base (9). Vacuum, applied through a port in the base mounting screw (44), provides the clamping force. The vacuum is held constant using a U-Cup seal (43). The cap (6) is centered about the base (9) using a hardened pin (41) and locating bushing (45). When the cap (6) is inserted into the base (9), the pin (41) prevents the piston (42) from contacting the inside walls of the centering bushing (46). To remove the cap, positive air pressure is applied to the air passage (44), collapsing the walls of the U-Cup seal (43), forcing the cap (6) out of the base (9) without causing wear on the seal (43) or the sealing surface of the centering bushing (46). This method, used alone, requires physical interaction from the operator in the form of placing the cap on the base to secure the disk, and removing the cap after testing is complete to remove the disk.

What is still desired is a new and improved apparatus and method for quickly securing disks on a spindle of a spinstand. Among other aspects and advantages, the new and improved apparatus and method will automate a prior art clamping method by mechanically placing the cap of a vacuum chuck on a disk and mechanically remove the cap from the disk without any physical participation from the operator.

SUMMARY OF THE DISCLOSURE

The present disclosure is directed to an apparatus and method which mitigates the aforementioned prior art limitations. According to one exemplary embodiment of the present disclosure, the apparatus comprises a base, rigidly attached to a spindle of a spinstand, a second base free to move in the radial direction relative to the spindle, and a plurality of linear actuators to consistently and quickly move a vacuum chuck cap to and from a disk placed on a spindle.

BRIEF DESCRIPTION OF THE DRAWINGS

The foregoing and other objects, features and advantages of the present disclosure will be apparent from the more particular description of exemplary embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF EXEMPLARY EMBODIMENTS

Figure 8:
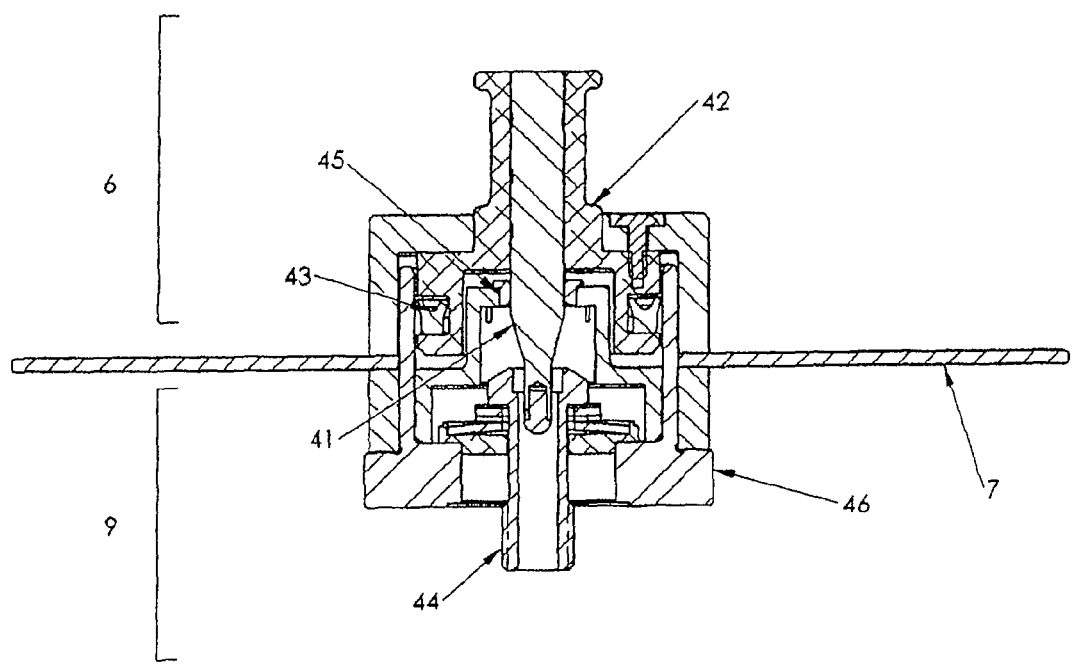
FIG. 8 is a side sectional view of a vacuum chuck for use with the invention, wherein a cap of the chuck is shown adjacent to a base of the chuck.

The present invention is an apparatus operable with a vacuum chuck assembly of the type shown FIG. 8, or a similar two piece clamp/chuck assembly, to automatically, preferably without user intervention, place a cap onto a magnetic disk supported on a base. With the cap so placed, the apparatus of the invention automatically, preferably without user intervention, automatically applies a clamp force to the cup and base to hold the magnetic disk in a desired position, for example on a spindle of a spinstand adapted to apply test signals and evaluate the magnetic disk and/or magnetic heads.

The apparatus of the invention in a preferred form includes a support on a base unit, for holding the base of a chuck assembly in place on a spinstand spindle, in a position to receive a magnetic disk-to-be tested or take-used-for test. A bracket is adapted with an end effector to selectively pick-up, hold and transport a cap for placement on the chuck base, securing the magnetic disk-to-be tested between the cap and the chuck base. The bracket is operatively coupled to a plurality of linear and/or rotary actuators to selectively position the bracket to pick up a cap from a location remote from the spindle/base, and transport that cap, and position it over the chuck base, with the magnetic disk in place. Then, for example, where the chuck assembly is a vacuum chuck of the type shown in FIG. 8, a vacuum is automatically preferably without user intervention, applied to the chuck to establishes a holding force to the cap relative to the chuck base, to hold the disk in place. A controller, preferably a programmed digital computer, controls the motion of the bracket relative to the chuck base and controls the vacuum applied to the chuck assembly. In alternative embodiments, the controller and other actuator driven placement elements are adapted to automatically, without user intervention, pick up and place and remove a magnetic disk with respect to the chuck assembly on the spindle of the spinstand.

Figure 1:
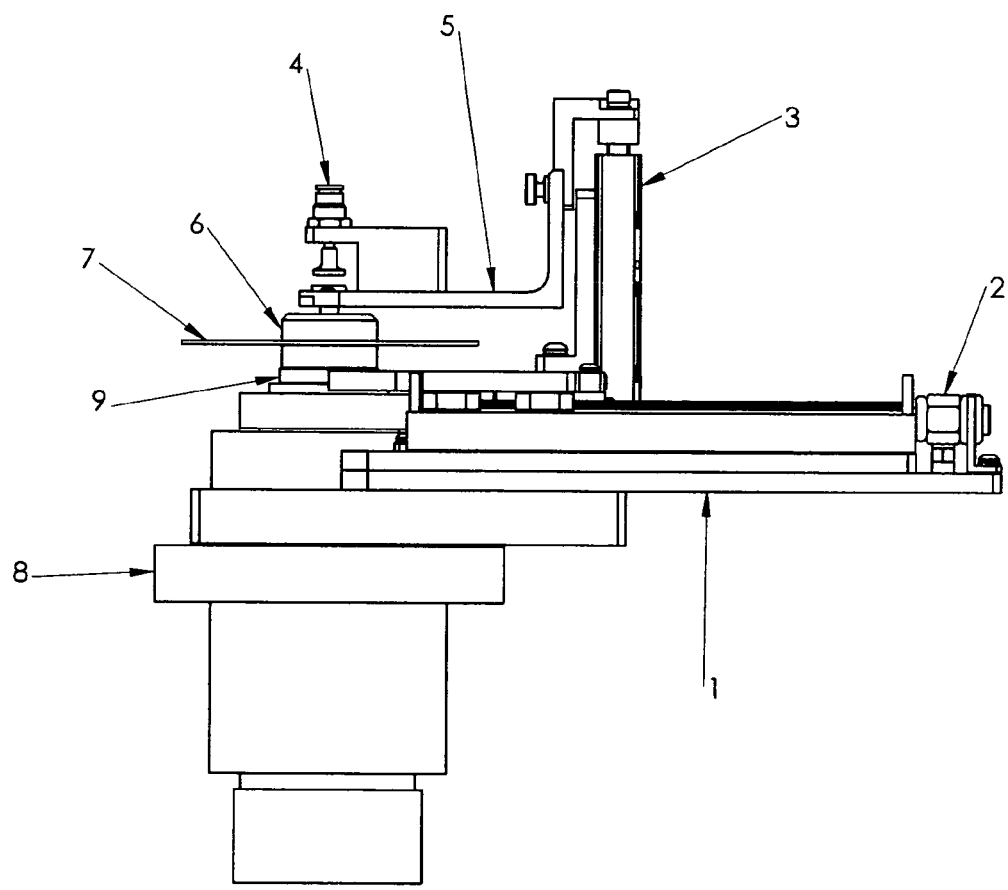
FIG. 1 is a side elevation view of an exemplary embodiment of an automated vacuum chuck mechanism, constructed in accordance with the present disclosure, shown with a disk secured in a testing position on a spindle.

Referring first to FIG. 1, there is shown an exemplary embodiment of a mechanism constructed in accordance with the present invention that secures cap 6 to disk 7 mounted on spindle 8 before spindle operation, and removes cap 6 from disk 7 mounted on spindle 8 after spindle operation. The mechanism is shown in the clamping position. Disk 7 is secured between cap assembly 6 and a base assembly 9 of the vacuum chuck during spindle operation. Chuck cap grip bracket 5 and linear actuator 4 are not in contact with the chuck during spinstand operation, allowing the spindle to rotate without interference. Chuck cap 6, chuck base 9, disk 7, and spindle 8 are shown for illustrative purposes.

Figure 2:
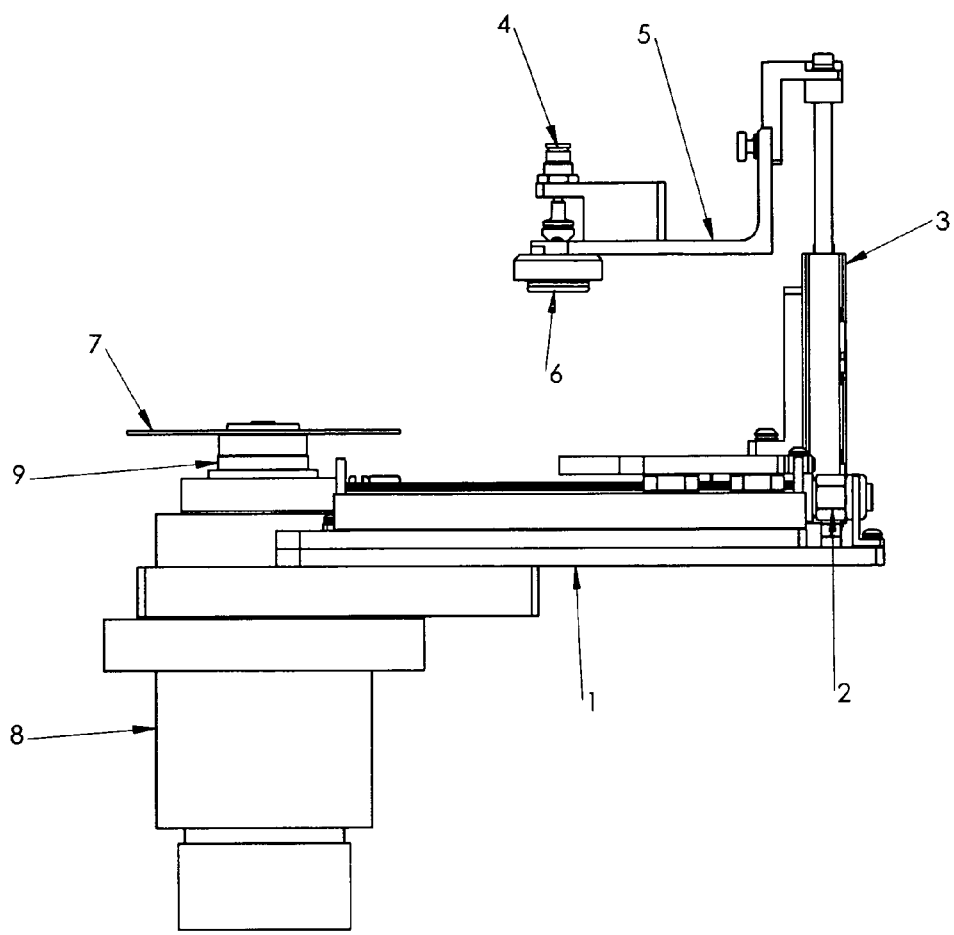
FIG. 2 is a side elevation view of an exemplary embodiment of an automated vacuum chuck mechanism, constructed in accordance with the present disclosure, shown with the disk free.
Figure 3:
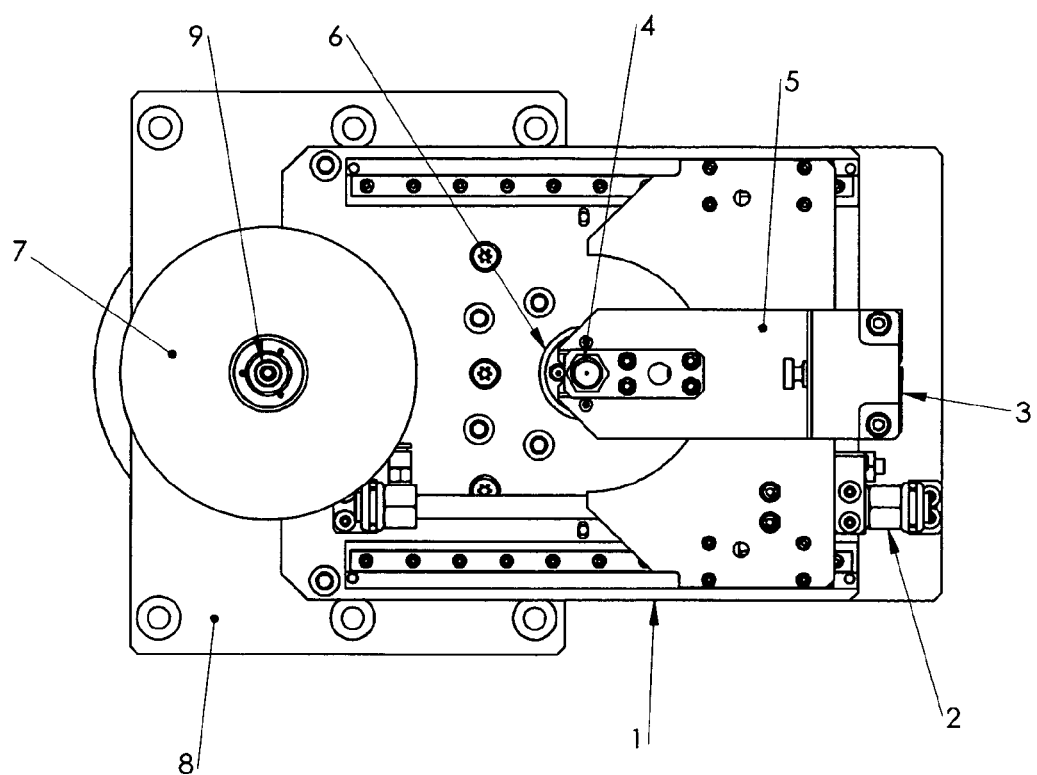
FIG. 3 is a top plan view of the vacuum chuck mechanism and the disk of FIG. 2.

Referring to FIGS. 2 and 3, the mechanism from FIG. 1 is shown in the retracted position. Cap 6 is held away from disk 7 to allow easy replacement of the disk when the spinstand is not operating. Chuck cap 6, chuck base 9, disk 7, and spindle 8 are shown for illustrative purposes.

Referring to FIGS. 1-3, there is a base 1 and linear actuator 2 arranged such that linear actuator 3 can be moved towards and away from spindle 8 in the radial direction. Linear actuator 3 is arranged normal to base 1, such that it moves chuck cap grip bracket 5, linear actuator 4, and vacuum chuck cap 6 towards and away from the spindle in the axial direction. Linear actuator 4 is arranged on bracket 5 such that it can clamp the handle of cap 6 against bracket 5, securing the cap during movements of linear actuators 2 and 3. The mechanism moves between the configuration of FIG. 1 and the configuration of FIGS. 2-3 by engaging actuator 4 against cap 6 and moving linear actuator 3 axially away from spindle 8, which removes cap 6 from base 9. Linear actuator 2 then moves actuator 3, grip bracket 5, and cap 6 away from the spindle in the radial direction. To return to the configuration of FIG. 1, the process is carried out in the reverse order, with linear actuator 4 disengaging cap 6 after cap 6 is inserted into base 9.

Figure 4:
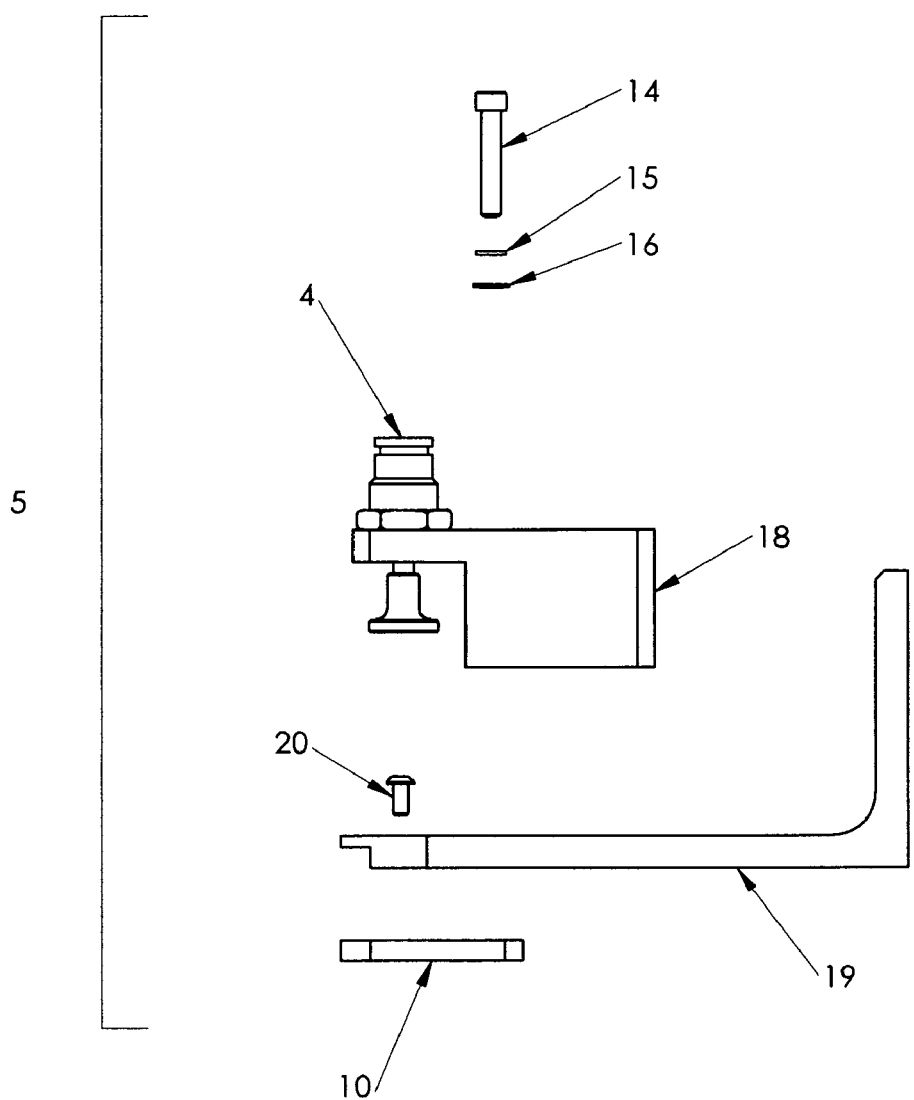
FIG. 4 is a side elevation view exploded view of bracket assembly 5 of FIG. 1-3.

Referring to FIG. 4, there is shown an exploded view of grip bracket 5. Grip bracket 5 is comprised of the bracket base 19, cap grip plate 10, fixed to base 19 by screw 20, actuator bracket 18, fixed to base 19 by screw 14 and washers 15 and 16. Linear actuator 4 is fixed to bracket 18 with external threads and a mating internally threaded hole. Linear actuator 4 secures cap 6 during motion by clamping the handle of cap 6 against plate 10. Linear actuator 4 also forces cap 6 into base 9 during clamping, releasing after vacuum is applied to the chuck and before spinstand operation begins.

Figure 5:
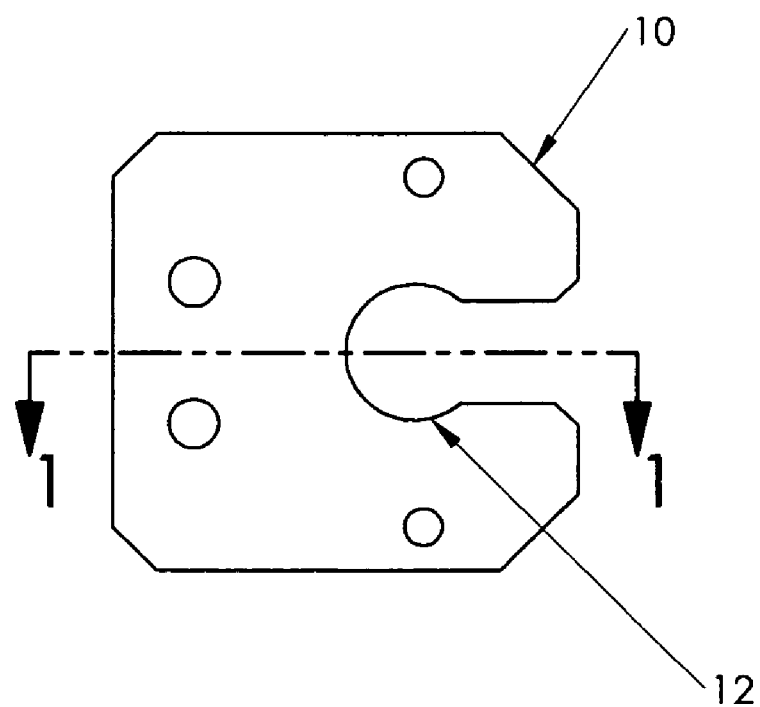
FIG. 5 is a top plan view of plate 10 of FIG. 4.

Referring to FIG. 5, there is shown a detail of plate 10, with slot 12 to contain cap 6 during movement. Slot 12 is a keyhole shape, with an end radius greater than the slot width. The keyhole shape allows a greater area of contact with the cap, preferably with a 240 degree arc length for the radius. This provides greater stability and locating accuracy for the cap when actuator 4 is engaged. It also provides lower contact pressure between plate 10 and cap 6, reducing wear and particle generation. This wear is also reduced when plate 10 is made from a hardened material, equal in hardness to the chuck cap material.

Figure 6:
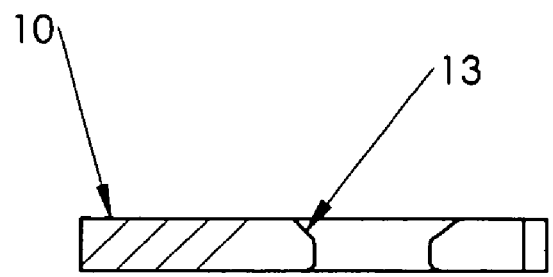
FIG. 6 is a cross section view along section line 1-1 of FIG. 5.

Referring to FIG. 6, there is an angle 13 shown in the cross section of slot 10. When the cap 6 handle uses an equal angle at the contact surface, the fit between bracket 5 and cap 6 has a greater contact area than using a flat surface, further reducing contact pressure and resulting wear on the parts.

Figure 7:
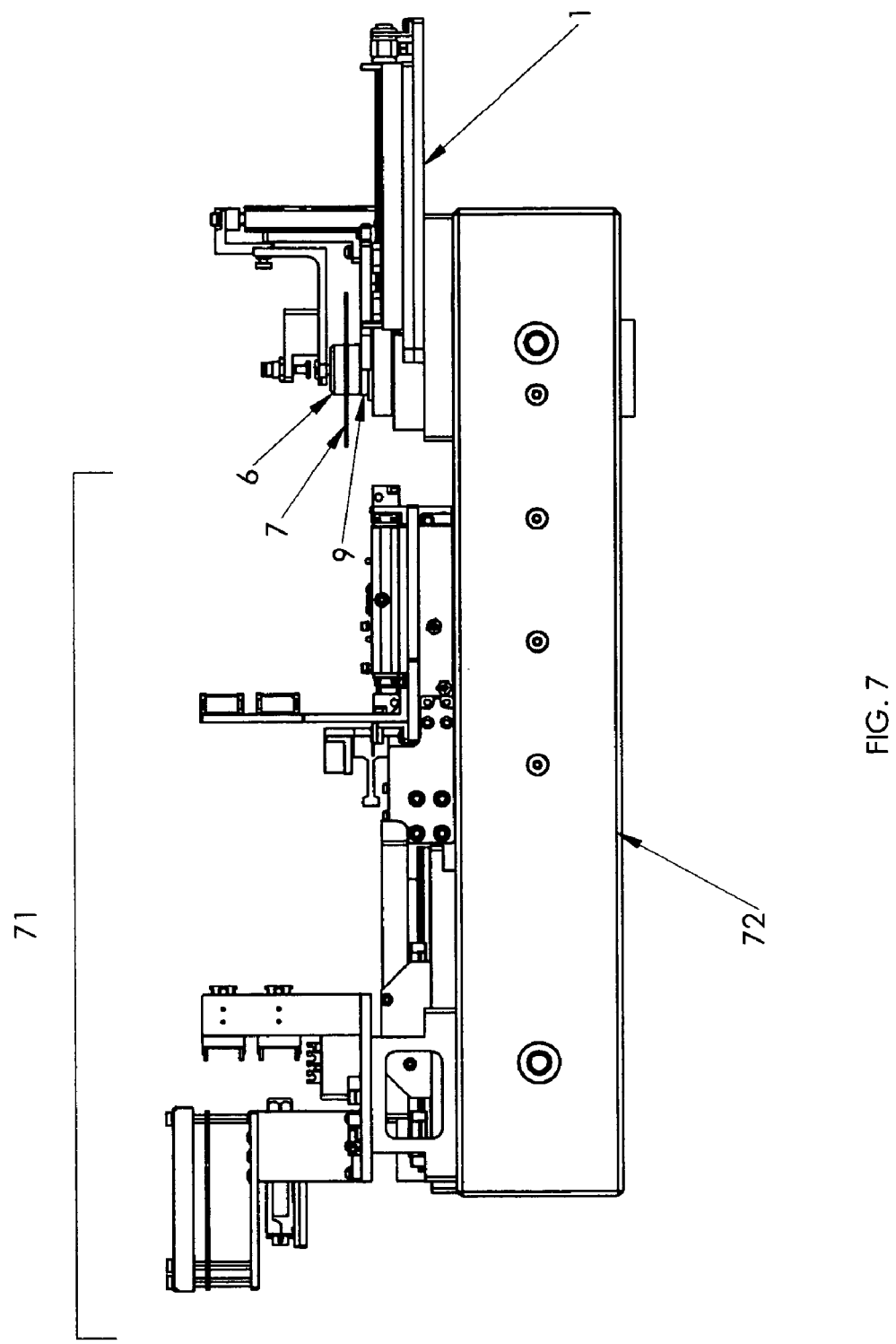
FIG. 7 is a side elevation view of the apparatus of FIG. 1 fixed to a spinstand.

Referring to FIG. 7, there is shown the apparatus of FIGS. 1-3 fixed to a spinstand 71 by granite base 72. This shows one possibility of the use of the invention with a testing device, though it is understood that the mechanism of FIGS. 1-3 may also be attached to other spinstand configurations using a bottom mount spindle.

Operation

For testing magnetic disk 7, the disk is placed on the flat surface of the base 9. The automated vacuum chuck mechanism is in the state shown in FIG. 2. With linear actuator 4 engaged, the automated vacuum chuck mechanism then moves towards the spindle in the radial direction using linear actuator 2 until chuck cap 6 is directly above base 9. Linear actuator 3 then moves the cap towards the spindle in the axial direction, placing the cap into the base. Linear actuator 4 disengages the cap from bracket 5, and testing begins. When testing is complete and the spindle is stationary, linear actuator 4 engages the cap, linear actuator 3 moves away from the spindle in the axial direction, and actuator 2 moves away from the spindle in the radial direction, allowing the operator to quickly replace the disc for the next test without having to move or hold the chuck cap manually.

SUMMARY, RAMIFICATION, SCOPE

Thus it has been shown that the automated vacuum chuck clamping mechanism provides a method by which a vacuum chuck cap can be automatically placed on and removed from a disc, enabling faster disk installation and removal times during testing by eliminating the need for the operator to manually move the chuck cap when replacing disks.

While this disclosure has been particularly shown and described with references to exemplary embodiments thereof, it will be understood by those skilled in the art that various changes in form and details may be made therein without departing from the spirit and scope of the disclosure.

What we claim is:

1. A mechanism to place a vacuum clamping device on a magnetic disk for testing on a spinstand, comprising:
    a base rigidly attached to a rotating spindle for use with a plurality of magnetic disks, said base having a flat top and a bottom surface,
    a first linear actuator mounted to said base and oriented radially to the spindle,
    a second linear actuator mounted to a moving portion of said first linear actuator, said second linear actuator oriented normal to said base, and said second linear actuator operating in an axial direction relative to an axis of rotation of the spindle, and
    a bracket attached to a moving portion of said second linear actuator, said bracket having a slot to accommodate a member of the vacuum clamping device, and
    a third linear actuator attached to said bracket and placed parallel to said second linear actuator, said third linear actuator located directly above said slot.

2. The mechanism of claim 1, wherein the member of the vacuum clamping device comprises a clamping cap of the vacuum clamping device, and
    wherein radial and axial movement of the clamping cap relative to the axis of rotation of the spindle by the first, second and third linear actuators are arranged such that the clamping cap of the vacuum clamping device can be placed onto a magnetic disk on the spindle.

3. The mechanism of claim 1, wherein the member of the vacuum clamping device comprises a clamping cap of the vacuum clamping device, and
    wherein radial and axial movements of the clamping cap relative to the axis of rotation of the spindle by the first, second and third linear actuators are arranged such that the clamping cap of the vacuum clamping device can be removed from a magnetic disk on the spindle.

4. The mechanism of claim 1, further comprising the member of the vacuum clamping device, wherein the member of the vacuum clamping device is a clamping cap, the clamping cap being securely held using the third linear actuator during movement of the clamping cap.

5. The mechanism of claim 4, wherein said third linear actuator is pneumatic.

6. The mechanism of claim 1, wherein the first linear actuator is a pneumatic linear actuator.

7. The mechanism of claim 1, wherein the second linear actuator is a pneumatic linear actuator.

8. The mechanism of claim 1, wherein the member of the vacuum clamping device is secured using said slot, said bracket having an angled wall adjacent to the slot.

9. The mechanism of claim 8, wherein said angled wall is at an angle of 45 degrees with respect to a top surface of the bracket.

10. The mechanism of claim 8, wherein said slot is formed in a portion of the bracket, said bracket made from 440 C stainless steel.

11. The mechanism of claim 8 wherein said is a keyhole shape.

12. The mechanism of claim 11 wherein said keyhole shape has a radius with an arc length of 240 degrees.

* * * * *

UNITED STATES PATENT AND TRADEMARK OFFICE
CERTIFICATE OF CORRECTION

| | | |
|---|---|---|
| PATENT NO. | : 7,880,463 B2 | Page 1 of 1 |
| APPLICATION NO. | : 11/654214 | |
| DATED | : February 1, 2011 | |
| INVENTOR(S) | : Nahum Guzik et al. | |

It is certified that error appears in the above-identified patent and that said Letters Patent is hereby corrected as shown below:

Title page

Item 75 – Inventor

"Naham Guzik" – should read "Nahum Guzik"

Signed and Sealed this
Nineteenth Day of April, 2011

David J. Kappos
*Director of the United States Patent and Trademark Office*